Feb. 6, 1940.  P. B. HOGE  2,189,361

DUST SCREEN VALVE MECHANISM

Filed March 11, 1937  2 Sheets-Sheet 1

Inventor
P. B. Hoge
By Mason Fenwick & Lawrence
Attorneys

Feb. 6, 1940.  P. B. HOGE  2,189,361
DUST SCREEN VALVE MECHANISM
Filed March 11, 1937  2 Sheets-Sheet 2
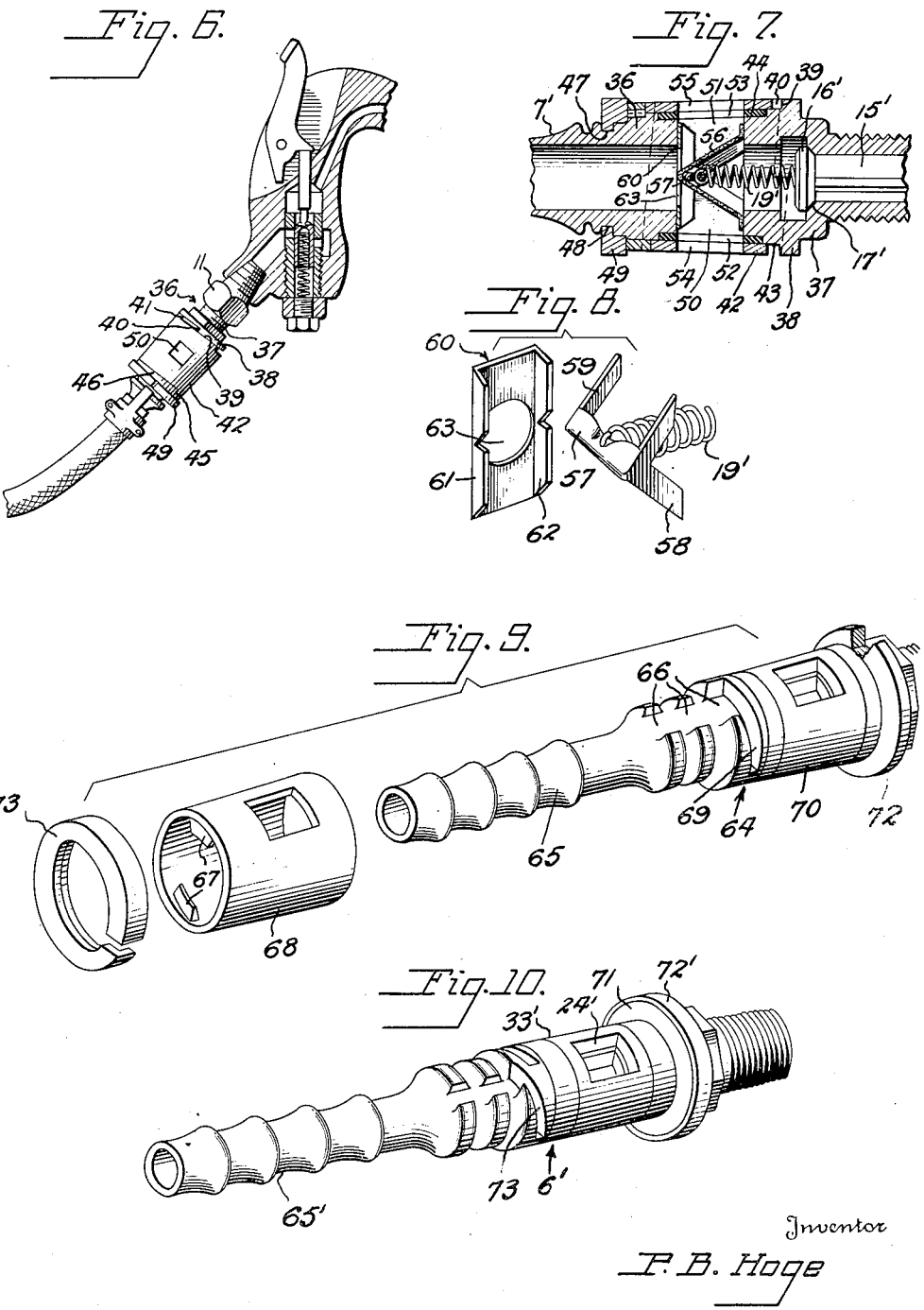

Patented Feb. 6, 1940

2,189,361

UNITED STATES PATENT OFFICE 2,189,361

DUST SCREEN VALVE MECHANISM

Philip Barlow Hoge, Elizabeth, N. J.

Application March 11, 1937, Serial No. 130,411

4 Claims. (Cl. 183—57)

This invention relates to improvements in mechanism for controlling the operation of pneumatic tools, or other machines operated by air under pressure; and particularly relates to mechanism including means for controlling the supply of compressed air to the tools, and for screening or cleansing the operating fluid of all foreign matter likely to obstruct the ducts or ports with which such tools or machines are provided.

In the operation of tools operated by compressed air, it is usual to provide the free end of a compressed air hose with a coupling adapted to be connected interchangeably with a fitting on the air inlet end of a series of different tools. In changing the air hose from one tool to another, it has heretofore been necessary for the operator to cut off the air supply to the hose at a base control valve, often quite distant from the location of tool operation. If the operator is working alone, he is compelled to walk back to the base valve to cut off the supply of air, return to the location of the tool to connect the hose thereto, and then walk back to the base valve to connect the air compressor to the hose line.

Frequently, this operation means a long climb down from a working platform and back. To avoid the delay, the operator very often merely puts a sharp kink in the hose, to cut off the air supply and holds the kink in one hand or under his knee while changing the end hose fitting from one tool to another. This is a dangerous practice, for if the hose slips from the workman's grasp, with the full pressure on it, it will whip around wildly, and may cause serious injury or damage. This kinking of the hose also causes it to break down and split, and wear out sooner than it should. In spite of this danger, workmen will persist in kinking the hose, in order to avoid the trouble involved in cutting off the air supply at the base valve.

The main object of the present invention is, therefore, to provide a device adapted to be secured to the free end of an air hose, which will automatically cut off the flow of compressed air upon disconnection of the tool therefrom.

A further object of the invention is to provide a device of this type, with a screen for filtering the air, and with means whereby the cleansing of the screen or filter may be effected, whether the device is or is not connected to a tool.

Other objects of the invention will become apparent as the detailed description thereof proceeds.

Figure 1:
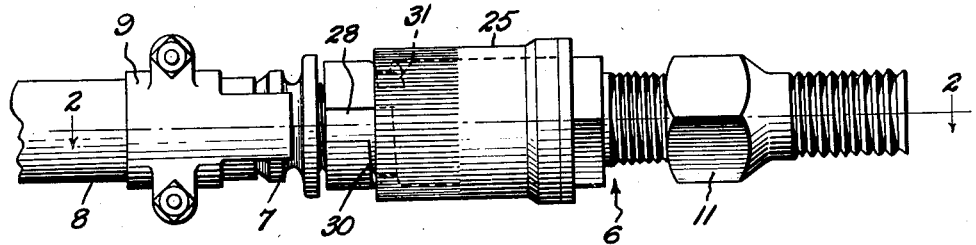
Figure 1 is a side elevation of one form of the air control device applied to a bushing which may be considered as a part of a compressed air tool.
Figure 2:
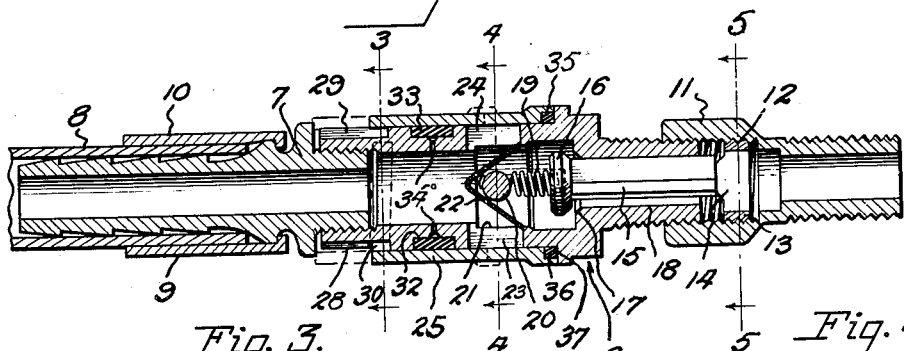
Figure 2 is a section taken on the line 2—2 of Figure 1.
Figure 3:
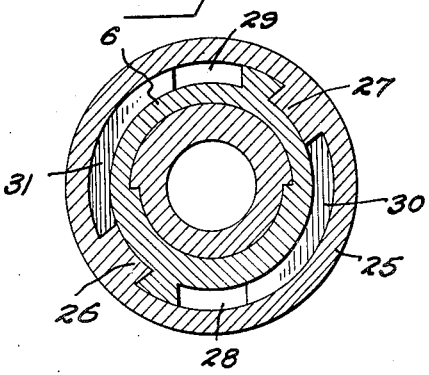
Figure 4:
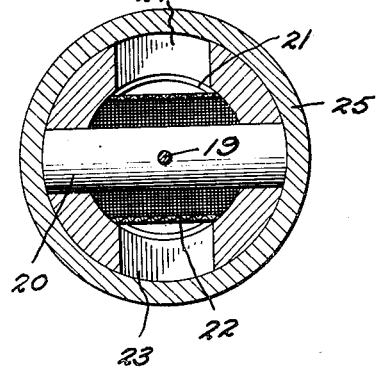
Figure 5:
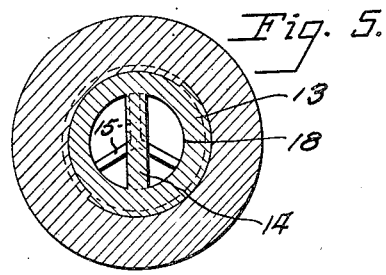

Figures 3, 4, and 5 are sections taken, to an enlarged scale, on the lines 3—3, 4—4, and 5—5, respectively, of Figure 2.

Figure 6 is a side elevation of another form of the device, shown as applied to the air intake end of a pneumatically operated tool;

Figure 7 is a central longitudinal section taken through the form of the device shown in Figure 6;

Figure 8 is an exploded perspective of a bridge and spacer forming supports for a filtering screen and a spring for controlling the movements of a valve;

Figure 9 is an exploded perspective of another form of the invention; and

Figure 10 is a perspective view of a valve stem forming the main part of a further modification.

Referring to the drawings, in which similar parts are designated by like numerals:

The form of the device shown in Figures 1 to 5, comprises a valve stem designated generally by the reference numeral 6. At its upper end, this valve stem is internally screwthreaded to receive the external screwthreaded end of a hose fitting 7, adapted to receive one end of a hose of flexible pipe 8 connected at its other end to a source of air or other operating fluid under pressure. Clamps 9 and 10, of usual construction, may be employed to secure the hose firmly to the fitting 7.

The lower end of the valve stem 6 is externally screwthreaded to mesh with the internal screwthreads in the upper end of a bushing 11, adapted to be secured to a drill or other pneumatically operated tool. An externally screwthreaded ring 13 is adjustable in the bushing 11, and has a bridge 14 extending diametrically across it to constitute a support for the lower end of a trefoil stem 15 depending from a valve 16 which is adapted to seat on a valve seat 17 formed at the upper end of the bore 18 in which the stem 15 slides.

In Figure 2 of the drawings, the valve 16 is shown as raised from the seat 17 to permit the air under pressure to pass through the bore 18 and bushing 11 to the trigger valve end of a pneumatically operated tool, such as is illustrated in Figure 6 applied to another form of the invention. The bridge 14 holds the valve 16 from its seat while the device is connected to the tool. Upon disconnection of the same, the valve 16 is forced automatically onto its seat 17 to shut off the air supply and permit the compressed air hose to be connected to any other suitable tool without necessitating operation of the base valve. The bushing 11 is to be considered as part of the tool; and in some cases may be omitted altogether, where the fitting may be connected directly to an internally screwthreaded end of the tool which would be provided with the externally screwthreaded ring 13.

The valve 16 is forced yieldingly towards its seat 17 by means of a compression spring 19, one end of which is seated against the valve 16, and the other end of which is suitably secured to a cross bar 20, which extends diametrically across the enlarged bore 21 formed in the valve stem 6 in continuation of the bore 18 at the lower end thereof. The rod 20 not only constitutes an abutment for the spring 19, but also serves as a transverse support for an apex end of an inverted V-shaped screen 22, the lower ends of which may be suitably secured as by friction fit to the bore 21.

On opposite sides of the rod 20, the stem 6 is provided with vents 23 and 24 as wide as the width of the screen and substantially as deep as the screen from its upper edge or apex to the base thereof. Directly above and below the vents 23 and 24, the valve stem 6 is turned to form a cylindrical surface adapted to receive, rotatably and slidably, a sleeve 25. The sleeve 25 is provided with diametrically opposite lugs 26 and 27 near the upper end thereof and adapted to enter the slots 28 and 29, respectively, formed in the upper end of the valve stem 6. The slots 28 and 29 are substantially vertical in the normal operating position of the mechanism, and communicate at their lower end, respectively, with the slightly inclined slots 30 and 31, respectively. These inwardly projecting lugs 26 and 27 constitute a sort of bayonet joint between the sleeve and valve stem for securing the sleeve 25 in the position shown in Figure 2 to cover the vents 23 and 24 when the tool is in operation.

The cylindrical surface of the valve stem is provided with a recess 32 in which is seated a cylindrical gasket 33 of rubber or other suitable resilient material. In order to form an effective fluid tight seal between the valve stem and the sleeve 25, the said stem is provided with a series of small radial apertures 34 which extend to the back of the gasket 33 and by air pressure force the gasket into sealing contact with the inner surface of the sleeve 25. The lower end of the sleeve 25 is provided with an annular recess 35 forming a cup to receive an annular gasket 36 which is seated upon a shoulder 37 formed in the valve stem 6.

As shown in Figure 2 of the drawings, the several parts of the invention are in position to effect operation of the pneumatic hammer or other tool connected to the bushing 11. The surface area of the wedge shaped screen 22 is considerably greater than the area of the cross section of the bore of the stem 6. This will make the area of the sum of the interstices or clear openings between the wires of the screen at least equal to or a little greater than the area of the said bore. This is an important feature of the wedge shaped screen, because a screen placed flat across the bore would have a much smaller free area and would interfere to some extent with the flow of air.

In the form of the invention illustrated in Figures 6 and 7, the hose fitting 7' is formed integral with the valve stem 36. The lower end 37 of this valve stem fits into the bushing 11, with the tre-foil stem 15' of valve 16' supported in contact with the bridge 14 of the ring 13, in the same manner as the stem 15 is supported as shown in Figure 2.

Slightly above the valve seat 17', the stem 36 is provided with an outwardly directed flange 38 having its upper face 39 shaped to form a pair of oppositely disposed inclined planes, terminating in shoulders 40 which form stops for similar shoulders 41 formed on the correspondingly shaped lower edge of a tapered sleeve 42. The sleeve 42 is rotatably mounted on a correspondingly tapered surface 43 of the valve stem. A rubber gasket 44 is mounted in a recess in the surface 43, and has its outer surface substantially flush, or slightly projecting from, the tapered surface 43.

The upper edge of the sleeve 42 is also shaped to provide oppositely disposed inclined planes terminating in shoulders 45 adapted to cooperate with similar shoulders formed on a narrow sleeve 46 shaped to provide inclined planes corresponding to those formed on the upper edge of the sleeve 42. The hose connection 7' is provided with an annular recess 47 adapted to receive the annular flange 48 of a split ring 49 which forms a means for retaining the sleeves 42 and 46 in operative position on the valve stem.

The stem 37 is provided with diametrically opposite vents 50 and 51, each as wide as the width of the screen, and as deep as the screen from its apex to the base thereof. The gasket 44 is also provided with vents 52 and 53 registering with vents 50 and 51, respectively. The sleeve 42 is provided with similar vents 54 and 55 adapted to register with the other registering vents when properly positioned to clean out the screen.

The screen 56 is supported at its apex by the cross bar 57 which connects the upper ends of a pair of splayed standards 58 and 59. The compression spring 19' is secured at its upper end to the cross bar 57, and when in position has its lower end seated on the valve 16'. A bridge 60 extends across the stem 37 into the vents 50 and 51 to form a positioning means. The bridge 60 is provided at its opposite edges with flanges 61 and 62 each of which is notched at its center to seat over the upper ends of the standards 58 and 59 where they connect with the cross bar 57. The bridge is also provided with a central aperture 63 adapted to register with the bore of the valve stem 37 when the screen and its associated parts are properly located in the stem.

It will be apparent from Figure 7 of the drawings that the bridge 60, cross bar device and screen may be readily removed through the vents in the valve stem whenever the sleeve 42 is positioned to cause its vents 54 and 55 to register with the other vents. It will also be evident that the screen and the parts connected thereto may be just as readily inserted through the registering vents in the several parts of the device. Obviously, this construction enables the elements to be readily removed or assembled whenever it becomes necessary or desirable to do so.

The valve stem and the sleeve are slightly tapered in the upward direction. When the sleeve is rotated in a direction to effect the closing of the vents in the valve stem and gasket, the inclined plane construction of the edges of the sleeve and the cooperating elements on the valve stem cause a downward sealing movement of the sleeve which effectually prevents leakage of the compressed air from the valve fitting. The shoulders on the cooperating element limit the sleeve in its rotary movement from vent-opening to vent-closing position. Obviously, when the sleeve is rotated from vent-closing to vent-opening position, it is raised lengthwise of the valve stem to decrease the frictional contact of the inner surface of the sleeve with that of the gasket, whenever the latter is used.

This form of the invention is not to be considered as limited to the use of a rubber gasket encircling the stem. In actual practice, rubber vulcanized to the stem may be used, or any other suitable material may be used; or the gasket may be omitted altogether and the seal effected by a tight metal-to-metal fit. In the latter case, the gasket receiving recess would be omitted and the valve stem and sleeve would have to be ground together to form a proper seal.

In the form of the invention illustrated in Figure 9, the screen and valve mechanism mounted in the stem 64 is identical with that illustrated in Figures 7 and 8. In this form, however, the flanges formed in the hose connecting part 65 are provided with oppositely disposed slots 66 adapted to receive slidably, the inwardly projecting lugs 67 formed on opposite sides of the inner surface of the sleeve 68 near the upper edge thereof. The lugs 67 are adapted to be received in the downwardly inclined groove 69, whereby rotation of the sleeve in clockwise direction on the inclined surface 70 of the stem will force the adjacent faces of the sleeve and stem into sealing engagement with each other. A split ring 73 similar to that used in the form of the invention illustrated in Figure 8, is also used in this form to maintain the sleeve in position.

The form of the invention illustrated in Figure 10 is substantially the same as that shown in Figure 2, except that the stem 65' has been made in one piece instead of two. The slot 73 is more in the nature of a screwthread than the bayonet joint slot shown in Figures 1 and 2; and the gasket 71 is inserted in a recess in the flange 72', instead of in a recess formed in the sleeve as shown in Figure 2. The hose fitting 65' is made integral with the stem 6'. Since the other parts of this form of the invention are the same as are shown in Figure 2, similar reference numerals primed are used to designate the corresponding parts. The screwthread construction is easier to make and cheaper to manufacture.

It is believed the operation of the various forms of this invention will be apparent to persons skilled in the art without further description.

Numerous variations may doubtless be devised by persons skilled in the art without departing from the principles of my invention. I, therefore, desire no limitations to be imposed on my invention, except such as are indicated in the appended claims.

What I claim is:

1. A dust screen valve mechanism comprising in combination an apertured casing having a central air passage therethrough with inlet and outlet openings in communication therewith and plural radially extending air vents in the sides thereof, a sleeve valve rotatable on said casing for axial movement with respect thereto whereby to open and close said vents, a filter screen within said casing adjacent said vents, said screen arranged to filter fluids passing through the aforesaid outlet and positioned with respect to said vents for rapid cleaning of the screen, said screen constructed to provide a fluid flow area at least as great as the area of the outlet.

2. A dust screen valve mechanism comprising in combination an apertured casing having an air passage therethrough with inlet and outlet openings in communication therewith and plural radially extending air vents in the sides thereof, a sleeve valve rotatable on said casing for axial movement with respect thereto whereby to open and close said vents, a filter screen within said casing adjacent said vents extending transversely thereof and being substantially V-shaped in transverse cross section, said screen arranged to filter fluids passing through the aforesaid outlet and positioned with respect to said vents for rapid cleaning of the screen, said screen constructed to provide a fluid flow area at least as great as the area of the outlet.

3. A dust screen valve mechanism comprising in combination an apertured casing having a central air passage therethrough with inlet and outlet openings in communication therewith, a plurality of radially extending air vents in the side walls of said casing and in communication with said passage, a sleeve valve on said casing for relative movement with respect thereto whereby to open or close said vents, a removable bridge member extending through said passage and transversely of said casing, a filter screen within said casing supported on said bridge adjacent said vents, said screen arranged to filter fluids passing between the inlet and outlet openings of said casing and positioned with respect to said vents whereby an actuation of the sleeve valve to open the vents will effect a rapid cleaning of said screen, and said screen constructed to provide an unobstructed fluid flow area at least as great as the area of said outlet.

4. A dust screen valve mechanism comprising in combination an apertured casing having a central air passage extending therethrough with inlet and outlet openings in communication therewith, radially extending air vents in the side wall of said casing, a sleeve valve on said casing arranged for relative movement with respect thereto whereby to open and close the vents, a check valve in said casing to close said outlet, a shoulder in said passage adjacent said vents, a removable bridge member extending transversely through the passage in said casing adjacent said vents, said bridge member removably secured in said casing, spring means interposed between said bridge member as an abutment and said check valve, whereby to bias said valve in outlet closing position, a V-shaped filter screen in said casing adjacent said vents mounted with its apex on said bridge member pointing against the air stream and with the legs of the V on said shoulder, said screen arranged to filter fluid passing through said outlet, whereby actuation of said sleeve valve opens the air vents and effects rapid cleaning of said screen.

PHILIP BARLOW HOGE.